No. 700,252. Patented May 20, 1902.
O. R. SMITH & F. T. BISBEE.
FENCE POST MAKING MACHINE.
(Application filed Sept. 6, 1901.)

(No Model.) 2 Sheets—Sheet 1.

Witnesses.
Fred R. Dowsett.
J. Howard Gordon.

Inventors.
Orien R. Smith
Fred T. Bisbee
By LaFayette Peavey
attorney

No. 700,252. Patented May 20, 1902.
O. R. SMITH & F. T. BISBEE.
FENCE POST MAKING MACHINE.
(Application filed Sept. 6, 1901.)
(No Model.) 2 Sheets—Sheet 2.

Witnesses.
Fred R. Dowsett.
J. Howard Gordon.

Inventors.
Orien R. Smith
Fred T. Bisbee
By LaFayette Peavey
attorney.

UNITED STATES PATENT OFFICE.

ORIEN R. SMITH AND FRED T. BISBEE, OF ATHENS, MICHIGAN.

FENCE-POST-MAKING MACHINE.

SPECIFICATION forming part of Letters Patent No. 700,252, dated May 20, 1902.

Application filed September 6, 1901. Serial No. 74,532. (No model.)

*To all whom it may concern:*

Be it known that we, ORIEN R. SMITH and FRED T. BISBEE, citizens of the United States, residing at Athens, in the county of Calhoun and State of Michigan, have invented certain new and useful Improvements in Fence-Post-Making Machines; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to improvements in fence-post-making machines.

Our objects are, first, to provide a proper form or flask for holding cement or other plastic material which may also inclose a column or framework of metal; second, the application of power to both the open ends of the forms or flasks and the material pressed vertically at both ends at the same operation; third, a method of moving the forms or flasks into positions for filling, to receive the pressure, and discharge them by wheels having circumferentially-grooved rims, moving automatically, as hereinafter described. We attain these objects by the mechanism illustrated in the accompanying drawings, in which—

Figure 5:
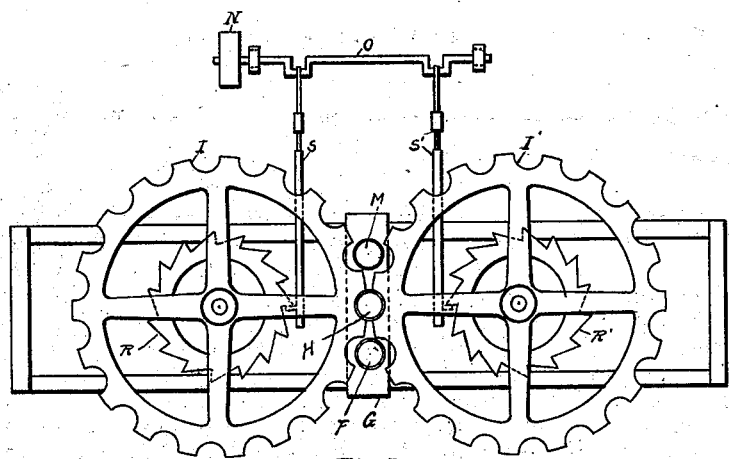

Fig. 5 shows a sectional elevation of the machine as used in molding posts, where form or flask F has just been placed on the guide-plate G to be filled with cement. We next see the center form or flask H as it is held in position for pressure by the form-supports I and I', while form M is ready to be discharged as a finished post. The wheels I I and I' I' are notched in their peripheries, something after the manner of certain cog-wheels. The notches are each adapted to receive a little less than half of the body of one of the flasks or formers heretofore described. Each pair of wheels I I' lies in the same plane, the edges of the two wheels coming into proximity, and a notch in each wheel then being in register with a corresponding notch in the other wheel and the two notches together making a receptacle which neatly embraces the flask, as shown in Fig. 5. One flask after another is fed into such receptacle, the rotation of the wheels producing a succession of such receptacles by which the flasks are fed along.

Figure 6:
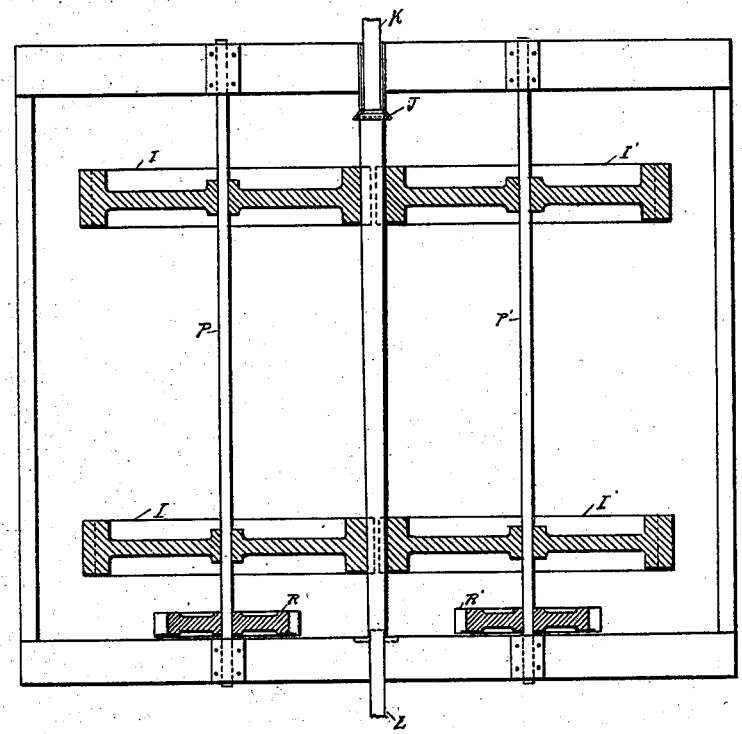

Fig. 6 shows a sectional elevation of the machine, showing the flask in position and the position and entrance of the plunger in the form.

In Fig. 5 we see form or flask F, which is now being filled with cement, having had the column or framework E placed in position, which form or flask is then moved into position for pressure by the guide-wheels I and I'. When in position as shown by flask H, the plunger-guide J in Fig. 6 drops down, centers the form or flask, and makes ready for the plungers K and L, which are now ready to press the cement into their form, as shown in Fig. 5 at H. The cement in this position is pressed at both ends at the same operation into the form of posts. After being pressed in this shape it is moved by the guide-wheels I and I' to the position shown at M, completing the post.

Figure 1:
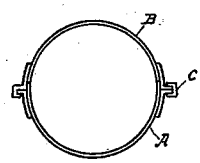
Figure 1 represents an end plan of the form or flask shown in position to receive the cement or material forming the post.
Figure 2:
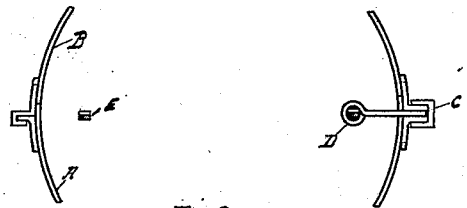
Fig. 2 represents a broken end section of the form or flask, which shows the method of connecting and clamping the same, and also shows the section of the column of framework of the post in position, and also shows loop-wires adapted to receive fence wire or strands and their position in reference to the form or flask.
Figure 3:
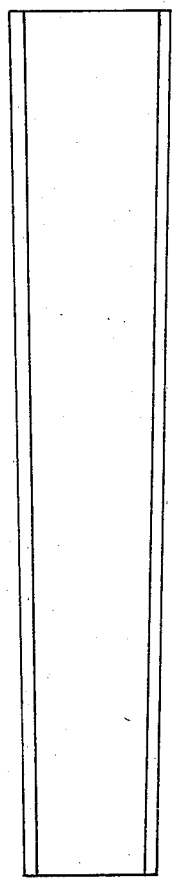
Fig. 3 shows an elevation of the flask, showing lock-pin holes for securely fastening the form or flask.

The form or flask shown particularly in Fig. 2, where an end section is represented showing its method of construction in two halves A and B, being held firmly together on the back sides by the novel manner as shown in drawings, one edge having an L-shaped piece of metal attached extending the length of the form, the other edge having a hook-shaped piece for engaging the L-shaped piece. The front of the form or flask is held together by a bead C, which passes over the two L-shaped pieces of metal attached to either half of the form or flask, clamping the same firmly and also covering the loops D, projecting from the framework E, in the post.

Figure 4:
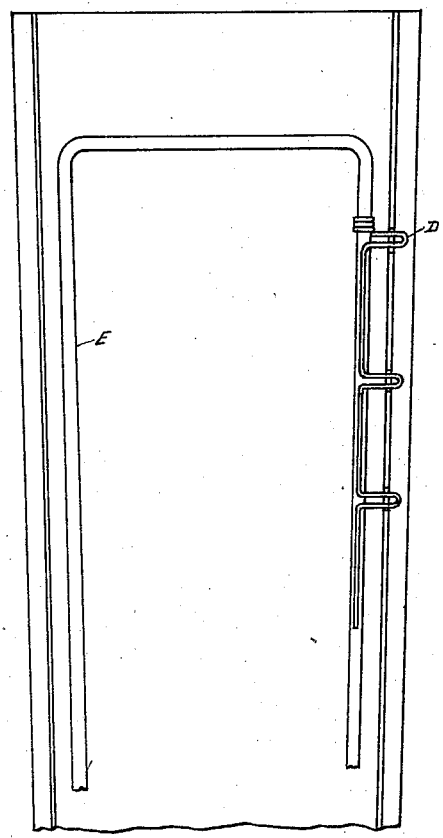
Fig. 4 represents one-half of the form or flask looking from the inner side, which also shows the position of the column or framework of the post and the wire attachment forming the loops to receive the fence-wire.

In Fig. 4 we see the form or flask as shown with the column or framework within in position ready for the cement. This machine is operated by a friction-clutch, which allows the throwing out or in of the power, as is desired. The friction-clutch end being driven gives power to crank-shaft O, which operates the ratchets R and R′, which are secured to shafts P and P′. The guide-forms being attached to these shafts are made to move one notch at every operation of the ratchet, as is clearly shown in Fig. 5.

By this method of making cement posts we make a more compact and solid post and a more durable and stronger post, as the power applied to the ends is less liable to leave a porous or spongy post than by a lateral pressure. It also makes a finished post.

What we claim as our invention, and desire to secure by Letters Patent, is—

1. The combination, in a machine for making fence-posts of plastic material, of a metallic flask and a frame at each end of said flask, a reciprocating plunger guided in said frame at each end of said flask, wheels at each side of said flask and having notches in their peripheries which embrace said flasks as described, and means for moving the wheels with a step-by-step movement, whereby the flasks are fed along and the ends of the posts are compressed by the plungers while the flasks are held by the wheels, substantially as described.

2. The combination of the post-making flask open at both ends, the plungers closing into said flasks, wheels at each side of the flasks having notches in their rims by which the flasks are supported, partly inclosed, and carried forward, and ratchet-and-pawl mechanism by which the wheels are rotated with a step-by-step movement, substantially as described.

3. In a machine as described, an open-ended flask composed of two hollow metallic sections, a hook and rib forming the connection at one side of the sections, and a rib on each part held in place by a grooved bead, at the opposite side of the sections, in combination with rotating notched wheels for feeding said flasks forward, and plungers for applying end pressure to the contents of the flask, all combined.

4. In a machine for molding concrete fence-posts, a hollow sectional flask, open at both ends, and means for holding the flask-sections together, means for feeding the flask and contents forward with a step-by-step movement, and reciprocating plungers at each end of the flask, to enter and compress the material therein, all combined substantially as described.

In testimony whereof we affix our signatures in presence of two witnesses.

ORIEN R. SMITH.
FRED T. BISBEE.

Witnesses:
JACOB KEENE,
DANIEL FOX.